United States Patent
Agiwal et al.

(10) Patent No.: US 11,503,645 B2
(45) Date of Patent: Nov. 15, 2022

(54) METHOD AND APPARATUS FOR PERFORMING COMMUNICATION IN WIRELESS COMMUNICATION SYSTEM

(71) Applicant: Samsung Electronics Co., Ltd., Suwon-si (KR)

(72) Inventors: Anil Agiwal, Suwon-si (KR); Jaehyuk Jang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/697,878

(22) Filed: Nov. 27, 2019

(65) Prior Publication Data
US 2020/0170046 A1 May 28, 2020

Related U.S. Application Data

(60) Provisional application No. 62/772,156, filed on Nov. 28, 2018.

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0092* (2013.01); *H04W 28/0278* (2013.01);
(Continued)

(58) Field of Classification Search
CPC ......... H04W 74/0833; H04W 28/0278; H04W 72/1268; H04L 5/0092
See application file for complete search history.

(56) References Cited

U.S. PATENT DOCUMENTS 9,125,218 B2 9/2015 Chang
9,839,013 B2 12/2017 Kim et al.
(Continued)

FOREIGN PATENT DOCUMENTS

CN 108886804 A 11/2018
EP 3 806 527 A1 4/2021
(Continued)

OTHER PUBLICATIONS

International Search Report and Written Opinion dated Aug. 6, 2019, issued in an International application No. PCT/KR2019/005236.

(Continued)

*Primary Examiner* — Kevin M Cunningham
(74) *Attorney, Agent, or Firm* — Jefferson IP Law, LLP

(57) ABSTRACT

Methods and apparatuses for performing communication in a wireless communication system are provided. The method, performed by a user equipment (UE), of performing the communication in the wireless communication system, according to an embodiment, includes identifying an ongoing random access (RA) procedure triggered for a pending scheduling request (SR) transmission, identifying whether an active uplink bandwidth part (UL BWP) or an active downlink bandwidth part (DL BWP) is switched at an initiation of the ongoing RA procedure and performing an operation of switching the active UL BWP or the active DL BWP to an initiation BWP or an operation of terminating the ongoing RA procedure based on a result of the identification.

6 Claims, 11 Drawing Sheets

(51) Int. Cl.
 *H04W 28/02* (2009.01)
 *H04W 72/14* (2009.01)
 *H04W 80/02* (2009.01)
 *H04W 72/12* (2009.01)

(52) U.S. Cl.
 CPC ....... *H04W 72/1268* (2013.01); *H04W 72/14* (2013.01); *H04W 80/02* (2013.01)

(56) References Cited

U.S. PATENT DOCUMENTS

| | | |
|---|---|---|
| 10,477,457 B2 | 11/2019 | Park et al. |
| 2009/0163211 A1 | 6/2009 | Kitazoe et al. |
| 2010/0284354 A1* | 11/2010 | Ostergaard ........ H04W 72/1284 370/329 |
| 2013/0279443 A1* | 10/2013 | Imagawa .......... H04W 56/0045 370/329 |
| 2015/0124728 A1* | 5/2015 | Bergstrom ............ H04L 5/0053 370/329 |
| 2015/0264655 A1* | 9/2015 | Lee ..................... H04W 52/365 370/329 |
| 2017/0195464 A1 | 7/2017 | Lee et al. |
| 2019/0166529 A1* | 5/2019 | Chen ..................... H04L 5/0096 |
| 2019/0182870 A1* | 6/2019 | Shih ...................... H04W 16/32 |
| 2019/0191464 A1* | 6/2019 | Loehr .................. H04W 28/0278 |
| 2019/0253230 A1* | 8/2019 | Loehr ..................... H04L 5/0098 |
| 2019/0335506 A1 | 10/2019 | Agiwal et al. |
| 2019/0335507 A1 | 10/2019 | Agiwal et al. |
| 2019/0335508 A1 | 10/2019 | Agiwal et al. |
| 2020/0044723 A1* | 2/2020 | Cirik ................. H04W 72/0453 |
| 2020/0059959 A1* | 2/2020 | Turtinen ................ H04W 74/02 |
| 2020/0100311 A1* | 3/2020 | Cirik ................... H04W 72/042 |
| 2021/0105776 A1 | 4/2021 | Jiang |

FOREIGN PATENT DOCUMENTS

| | | |
|---|---|---|
| KR | 10-2018-0049800 A | 5/2018 |
| WO | 2017/150863 A1 | 9/2017 |

OTHER PUBLICATIONS

Ericsson, 'Msg3 size for CCCH payload', R2-1803202, 3GPP TSG-RAN WG2 #101, Section 2; and figures 1-2; Feb. 15, 2018, Athens, Greece.

Ericsson, 'Size of MSG3 in NR', R2-1802638, 3GPP TSG-RAN WG2 #101, Sections 2-3; Feb. 16, 2018, Athens, Greece.

3GPP; TSG RAN; NR; Medium Access Control (MAC) protocol specification (Release 15), 3GPP TS 38.321 V15.3.0, Sep. 25, 2018 sections 5.1.4-5.15.

Huawei et al., 'Correction on the RA triggering with ongoing RA', R2-1817445,3GPP TSG-RAN WG2 #104 Meeting, Spokane, USA, Nov. 2, 2018 pp. 1, 3.

Interdigital, 'SR in NR-U', R2-1811459, 3GPP TSG-RAN WG2 Meeting # 103, Gothenburg, Sweden, Aug. 9, 2018 sections 2-3.

International Search Report dated Mar. 13, 2020, issued in International Application No. PCT/KR2019/016574.

Catt, "The Handling of sr-ProhibitTimer", 3GPP TSG-RAN WG #Adhoc, Vancouver, Canada, Jan. 22-26, 2018 (Jan. 12, 2018), XP051386048, R2-1800163.

Zte Corporation, "Consideration on the autonomous BWP switch", 3GPP Draft; R2-1712433, (Nov. 16, 2017), XP051370989.

Extended European Search Report dated Oct. 20, 2021, issued in European Patent Application No. 19888968.5-1215.

\* cited by examiner

METHOD AND APPARATUS FOR PERFORMING COMMUNICATION IN WIRELESS COMMUNICATION SYSTEM

CROSS-REFERENCE TO RELATED APPLICATION(S)

This application is based on and claims priority under 35 U.S.C. § 119(e) of a U.S. Provisional application Ser. No. 62/772,156, filed on Nov. 28, 2018, in the U.S. Patent and Trademark Office, the disclosure of which is incorporated by reference herein in its entirety.

BACKGROUND

1. Field

The disclosure relates to wireless communication systems. More particularly, the disclosure relates to methods and apparatuses for performing a bandwidth part operation in the wireless communication system.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

The above information is presented as background information only to assist with an understanding of the disclosure. No determination has been made, and no assertion is made, as to whether any of the above might be applicable as prior art with regard to the disclosure.

SUMMARY

In case of an ongoing random access procedure triggered for pending scheduling request (SR) transmission being cancelled, mismatch occurs between active DL/UL BWP at UE and gNB leading to data interruption. In addition, as per current procedure for random access procedure which is initiated on SCell and if RAR is received on SCell, UE will unnecessarily switch the DL BWP of SpCell. Additionally UE may not be on appropriate DL BWP for RAR reception resulting in RAR reception failure. BWP switching operation upon initiation of random access procedure needs to be enhanced.

Aspects of the disclosure are to address at least the above-mentioned problems and/or disadvantages and to provide at least the advantages described below. Accordingly, an aspect of the disclosure is to provide methods and apparatuses for performing communication in a wireless communication system.

Additional aspects will be set forth in part in the description which follows, and in part, will be apparent from the description, or may be learned by practice of the presented embodiments.

In accordance with an aspect of the disclosure, the UE may identify an ongoing random access (RA) procedure triggered for a pending scheduling request (SR) transmission, identify whether an active uplink bandwidth part (UL BWP) or an active downlink bandwidth part (DL BWP) is switched at an initiation of the ongoing RA procedure, and perform an operation of switching the active UL BWP or the active DL BWP to an initiation BWP or an operation of terminating the ongoing RA procedure based on a result of the identification.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
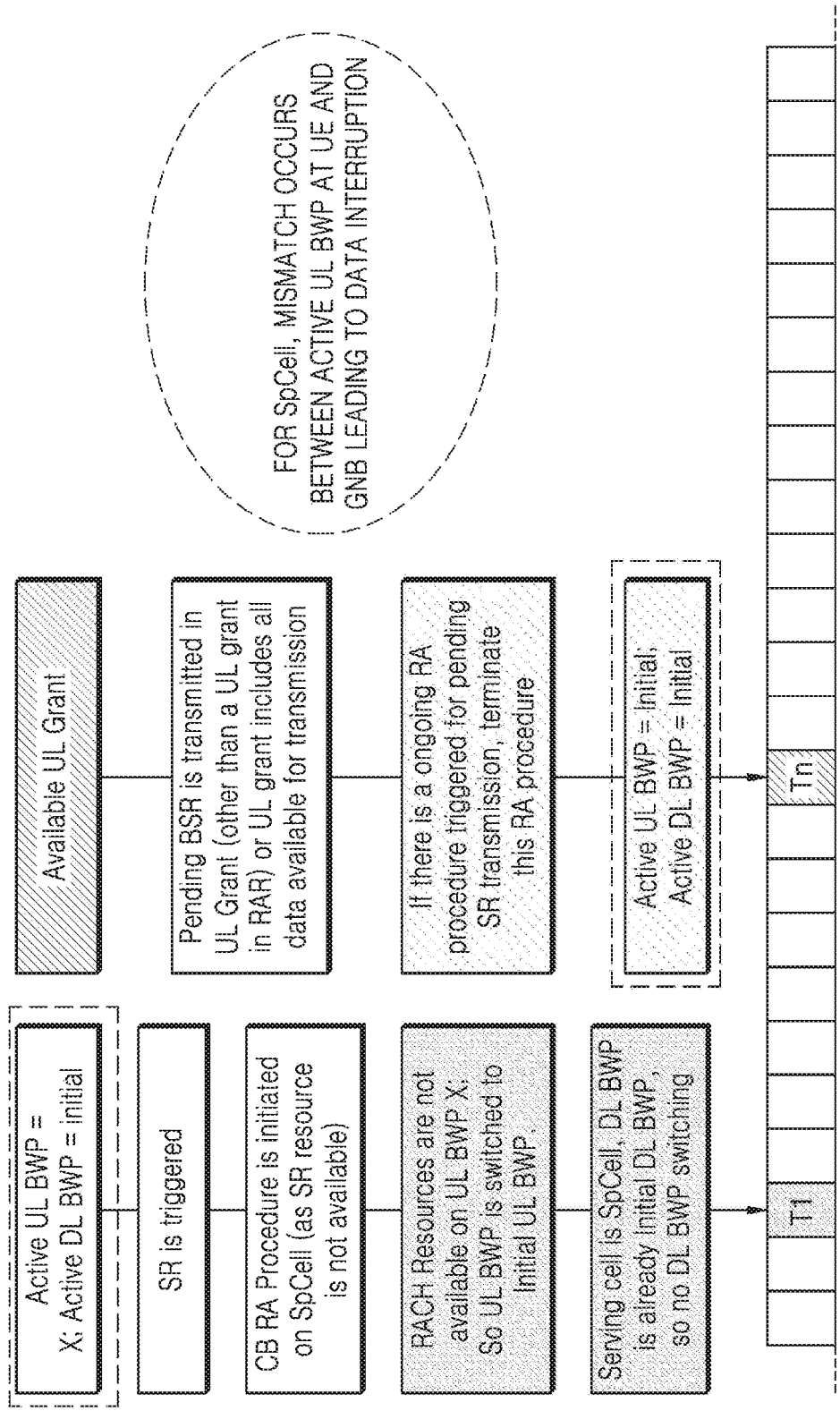
FIG. 1 is a diagram illustrating a mismatch occurs between active UL BWP at a UE and a gNB according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The application provides a method and an apparatus for performing a communication in a wireless communication system.

According to an aspect of the present invention, there is provided a method of performing communication in the wireless communication system, by a user equipment (UE). The method includes identifying an ongoing random access (RA) procedure triggered for a pending scheduling request (SR) transmission, identifying whether an active uplink bandwidth part (UL BWP) or an active downlink bandwidth part (DL BWP) is switched at an initiation of the ongoing RA procedure, and performing an operation of switching the active UL BWP or the active DL BWP to an initiation BWP or an operation of terminating the ongoing RA procedure based on a result of the identification. Preferably, the performing of the operation may include switching the active UL BWP to an initiation UL BWP in case of the active UL BWP being switched at the initiation of the ongoing procedure; and switching the active DL BWP to an initiation DL BWP in case of the active DL BWP being switched at the initiation of the ongoing procedure.

Preferably, the method may further includes terminating the ongoing RA procedure and wherein, in response to the termination of the ongoing RA procedure, identifying whether the active UL BWP or the active DL BWP is switched at the initiation of the ongoing RA procedure.

Preferably, the performing of the operation may include terminating the ongoing RA procedure in case of the active UL BWP being switched at the initiation of the ongoing procedure or in case of the active DL BWP being switched at the initiation of the ongoing procedure.

Preferably, the RA procedure is performed on a SpCell.

According to an aspect of the present invention, there is provided a method of performing communication in a wireless communication system, by a base station. The method includes receiving a scheduling request (SR) from a user equipment (UE), and initiating a random access (RA) procedure in case of the SR being unavailable; obtaining a primary system information (SI) window number and a secondary SI window number for a SI message, wherein the RA procedure for the UE is terminated based on whether an active uplink bandwidth part (UL BWP) or an active downlink bandwidth part (DL BWP) is switched at an initiation of the ongoing RA procedure.

According to an aspect of the present invention, there is provided a user equipment (UE) of performing communication in a wireless communication system. The UE includes a transceiver, and a processor coupled with the transceiver and configured to identify an ongoing random access (RA) procedure triggered for a pending scheduling request (SR) transmission, identify whether an active uplink bandwidth part (UL BWP) or an active downlink bandwidth part (DL BWP) is switched at an initiation of the ongoing RA procedure, and perform an operation of switching the active UL BWP or the active DL BWP to an initiation BWP or an operation of terminating the ongoing RA procedure based on a result of the identification.

According to an aspect of the present invention, there is provided a base station of performing communication in a wireless communication system The base station includes a transceiver, and a processor coupled with the transceiver and configured to control the transceiver to receive a scheduling request (SR) from a user equipment (UE), and initiate a random access (RA) procedure in case of the SR being unavailable, obtaining a primary SI window number and a secondary SI window number for a SI message, wherein the RA procedure for the UE is terminated based on whether an active uplink bandwidth part (UL BWP) or an active downlink bandwidth part (DL BWP) is switched at an initiation of the ongoing RA procedure.

Throughout the disclosure, the expression "at least one of a, b or c" indicates only a, only b, only c, both a and b, both a and c, both b and c, all of a, b, and c, or variations thereof. Throughout the specification, a layer (or a layer apparatus) may also be referred to as an entity. Hereinafter, operation principles of the disclosure will be described in detail with reference to accompanying drawings. In the following descriptions, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the specification.

For the same reasons, in the drawings, some elements may be exaggerated, omitted, or roughly illustrated. Also, a size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements. It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s).

The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables.

Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, in an embodiment of the disclosure, the "unit" may include at least one processor. In the following descriptions of the disclosure, well-known functions or configurations are not described in detail because they would obscure the disclosure with unnecessary details.

Hereinafter, for convenience of explanation, the disclosure uses terms and names defined in the 3rd generation partnership project long term evolution (3GPP LTE) standards. However, the disclosure is not limited to the terms and names, and may also be applied to systems following other standards.

In the disclosure, an evolved node B (eNB) may be interchangeably used with a next-generation node B (gNB) for convenience of explanation. That is, a base station (BS) described by an eNB may represent a gNB. In the following descriptions, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a user equipment (UE), a mobile station (MS), a cellular phone, a smartphone, a computer, or a multimedia system capable of performing communication functions. However, the disclosure is not limited to the aforementioned examples. In particular, the disclosure is applicable to 3GPP new radio (NR) (or 5th generation (5G)) mobile communication standards. In the following description, the term eNB may be interchangeably used with the term gNB for convenience of explanation. That is, a base station explained as an eNB may also indicate a gNB. The term UE may also indicate a mobile phone, NB-IoT devices, sensors, and other wireless communication devices.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system is being developed to meet the growing demand for high speed data services, support ultra-reliability and low latency applications.

The fifth generation wireless communication system will be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

The fifth generation wireless communication system (also referred as next generation radio or NR), supports stand-alone mode of operation as well dual connectivity (DC). In DC a multiple Rx/Tx UE may be configured to utilise resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in RRC_CONNECTED is configured to utilise radio resources provided by two distinct schedulers, located in two different nodes connected via a non-ideal backhaul and providing either E-UTRA (i.e. if the node is an ng-eNB) or NR access (i.e. if the node is a gNB). In NR for a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells.

In NR the term Master Cell Group (MCG) refers to a group of serving cells associated with the Master Node, comprising of the PCell and optionally one or more SCells. In NR the term Secondary Cell Group (SCG) refers to a group of serving cells associated with the Secondary Node, comprising of the PSCell and optionally one or more SCells.

In NR PCell (primary cell) refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

In NR, Bandwidth Adaptation (BA) is supported. With BA, the receiving and transmitting bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one. A UE in RRC_CONNECTED state, is configured with one or more DL and UL BWPs, for each configured Serving Cell. For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signalling, or by the MAC entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switches the active DL BWP to the default DL BWP or initial DL BWP (if default DL BWP is not configured).

In NR upon initiation of the Random Access procedure on a serving cell, if PRACH occasions are not configured for the active UL BWP of this serving cell: UE switches the active UL BWP to BWP indicated by initialUplinkBWP and if this serving cell is a SpCell, UE switches the active DL BWP to BWP indicated by initialDownlinkBWP. If PRACH occasions are configured for the active UL BWP of this serving cell: if the Serving Cell is a SpCell and if the active DL BWP does not have the same bwp-Id as the active UL BWP, UE switches the active DL BWP to the DL BWP with the same bwp-Id as the active UL BWP.

FIG. 1 is a diagram illustrating a mismatch occurs between active UL BWP at a UE and a gNB according to an embodiment of the disclosure.

The Scheduling Request (SR) is used for requesting UL-SCH resources for new transmission. The MAC entity may be configured with zero, one, or more SR configurations. An SR configuration consists of a set of PUCCH resources for SR across different BWPs and cells. For a logical channel, at most one PUCCH resource for SR is configured per BWP. If the MAC entity has no valid PUCCH resource configured for the pending SR, it initiates a Random Access procedure on the SpCell. If the ongoing random access procedure triggered for pending scheduling request (SR) transmission is cancelled, mismatch occurs between active DL/UL BWP at UE and gNB leading to data interruption.

Referring to FIG. 1, for SpCell UE's active UL BWP is BWP X and active DL BWP is initial DL BWP. Scheduling request is triggered. Contention based random access is initiated on SpCell as SR resource is not available. PRACH occasions are not configured on active UL BWP, so UL BWP is switched to initial UL BWP. DL BWP is not switched as DL BWP is already initial DL BWP. While the random access procedure is ongoing, UL grant becomes available and pending BSR is transmitted in UL grant (other than UL grant in RAR) or UL grant(s) includes all data available for transmission. The ongoing random access procedure triggered for pending SR transmission is terminated. In this scenario mismatch occurs between active UL BWP at UE and gNB leading to data interruption. At UE active UL BWP is initial UL BWP whereas at gNB it is UL BWP X.

Meanwhile, as per the current design of random access procedure, random access response or response of beam failure recovery request is received on SpCell irrespective of whether random access preamble is transmitted on SpCell or SCell. However, this procedure is being enhanced wherein random access response or response of beam failure recovery request is received on serving cell on which random access preamble is transmitted. As per current procedure for random access procedure which is initiated on SCell and if RAR is received on SCell, UE will unnecessarily switch the DL BWP of SpCell. Additionally UE may not be on appropriate DL BWP for RAR reception resulting in RAR reception failure. BWP switching operation upon initiation of random access procedure needs to be enhanced.

BWP Operation for SR Triggered RA Cancellation

If the ongoing random access procedure triggered for pending scheduling request (SR) transmission is cancelled, mismatch occurs between active DL and/or UL BWP at UE and gNB leading to data interruption. For example, consider a scenario wherein for SpCell, UE's active UL BWP is UL BWP X and active DL BWP is initial DL BWP. Scheduling request is triggered. Contention based random access is initiated on SpCell as SR resource (i.e. PUCCH resource for SR transmission) is not available. PRACH occasions are not configured on active UL BWP, so active UL BWP is switched to initial UL BWP. Active DL BWP is not switched as active DL BWP is already initial DL BWP. While the random access procedure is ongoing, UL grant (other than UL grant in RAR) becomes available and pending BSR is transmitted in this UL grant or this UL grant includes all data available for transmission. The ongoing random access procedure triggered for pending SR transmission is terminated. In this scenario mismatch occurs between active UL BWP at UE and gNB leading to data interruption. At UE active UL BWP is initial UL BWP whereas at gNB it is UL BWP X. Various methods proposed in this disclosure to overcome the abovementioned issue are explained below.

Figure 2:
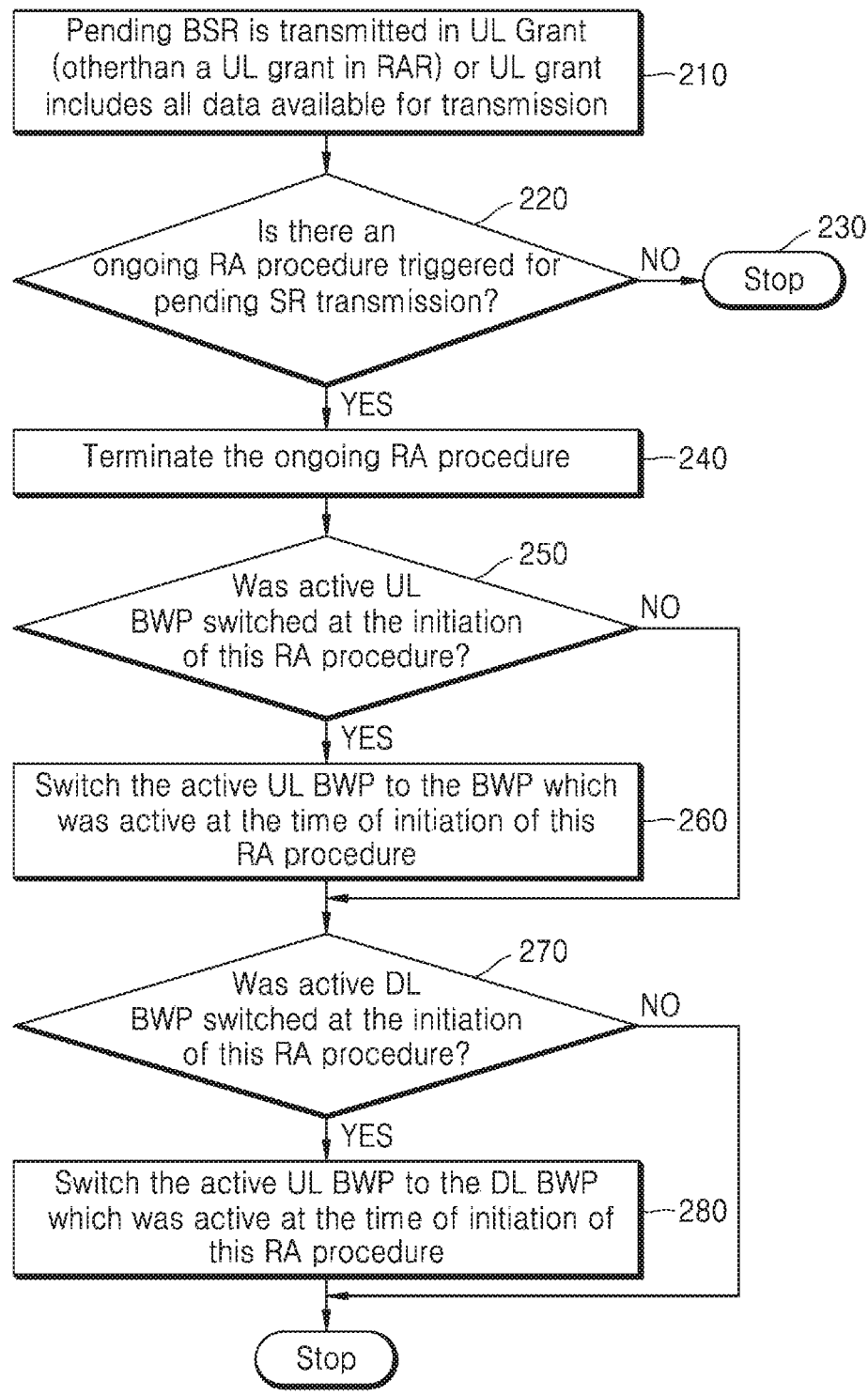
FIG. 2 is a flowchart illustrating an active BWP switching, according to an embodiment of the disclosure.

Method 1:

FIG. 2 is a flowchart illustrating an active BWP switching, according to an embodiment of the disclosure.

In operation 210, a pending scheduling request is cancelled. In an embodiment, a pending scheduling request which is triggered for buffer status report (BSR) is cancelled when a MAC PDU is transmitted using a UL grant other than a UL grant provided by Random Access Response, and this PDU includes a BSR MAC CE which contains buffer status up to (and including) the last event that triggered a BSR prior to the MAC PDU assembly or when UL grant(s) includes all data available for transmission. In another embodiment, a pending scheduling request which is triggered for sidelink buffer status report (SL BSR) is cancelled when a MAC PDU is transmitted using a UL grant other than a UL grant provided by Random Access Response, and this PDU includes a SL BSR MAC CE which contains buffer status up to (and including) the last event that triggered a SL BSR prior to the MAC PDU assembly or when SL grant(s) includes all SL data available for transmission. In another embodiment, a pending scheduling request which is triggered for transmitting a CQI report over SL is cancelled when a SL MAC PDU is transmitted using a SL grant, and this PDU includes a CQI report MAC CE which contains CQI report triggered prior to the MAC PDU assembly.

In operation 220, the UE identifies whether there is an ongoing random access procedure triggered for pending scheduling request which is cancelled in operation 210.

In operation 230, if there is no ongoing random access procedure, the UE stops operation relating the active BWP switching according to an embodiment of the disclosure.

In operation 240, if the ongoing random access procedure exists, the UE terminates the ongoing RA procedure. If there is an ongoing random access procedure triggered for pending SR, MAC entity terminates the ongoing random access procedure.

In operation 250, the UE identifies whether the active UL BWP was switched at the time of initiation of this RA procedure.

In operation 260, if the active UL BWP was switched at the initiation of this random access procedure, MAC entity switches the active UL BWP to the UL BWP which was active at the time of initiation of this random access procedure. For example if the active UL BWP was switched from UL BWP X to UL BWP Y at the time of initiation of this random access procedure, upon termination of random access procedure, UL BWP is switched from UL BWP Y to UL BWP X.

In operation 270, the UE identifies whether the active DL BWP was switched at the time of initiation of this RA procedure.

In operation 280, if the active DL BWP was switched at the initiation of this random access procedure, MAC entity switches the active DL BWP to the DL BWP which was active at the time of initiation of this random access procedure. For example if the active DL BWP was switched from DL BWP X to DL BWP Y at the time of initiation of this random access procedure, upon termination of random access procedure, DL BWP is switched from DL BWP Y to DL BWP X. It is to be noted that SR triggered random access procedure is performed on SpCell. So UL BWP and DL BWP in the above description refers to UL BWP and DL BWP of SpCell. In case multiple active DL BWP(s) and multiple active UL BWP(s) are supported in a serving cell, active UL BWP and active DL BWP in the above description refers to UL BWP and DL BWP on which random access procedure is performed.

Figure 3:
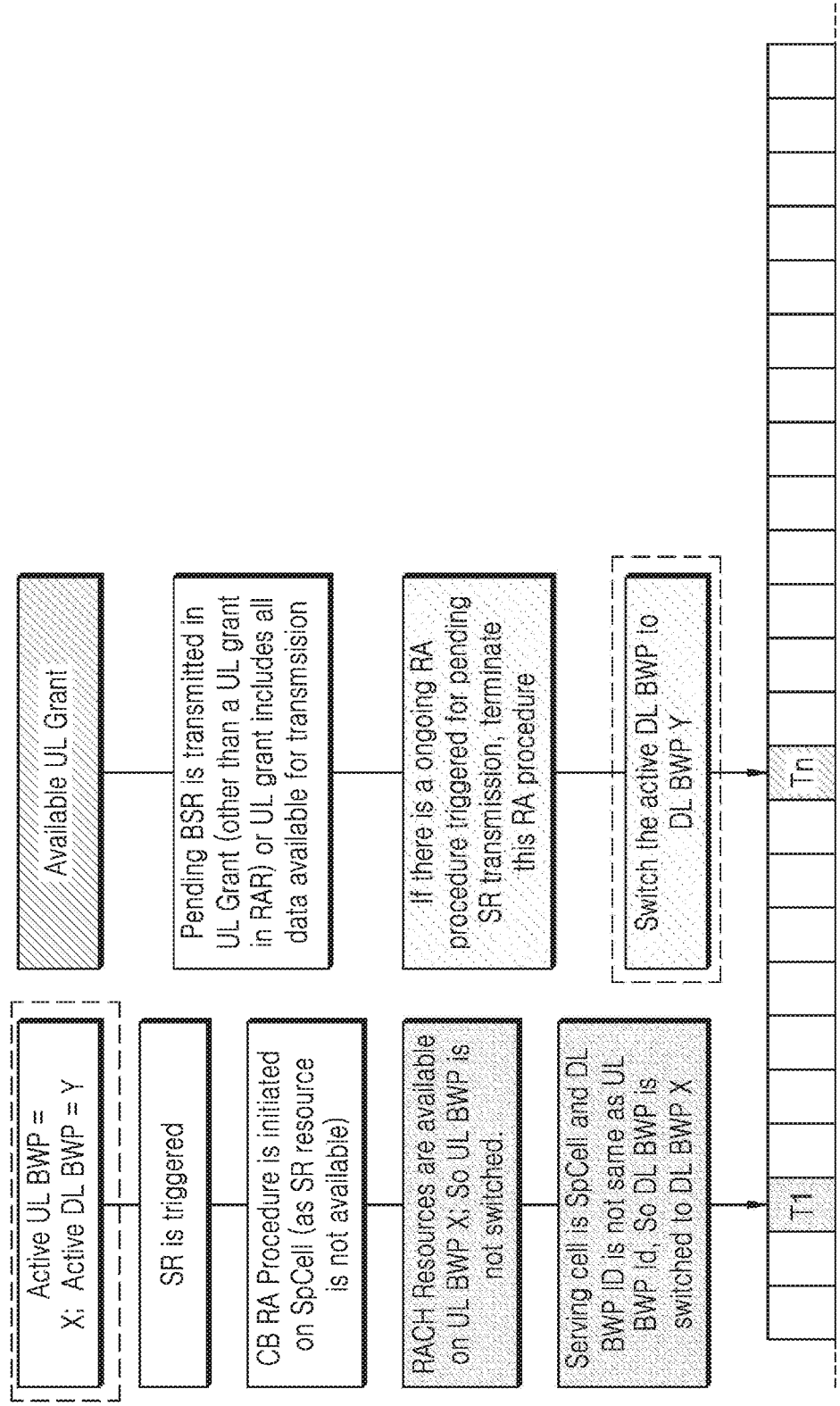
FIG. 3 is a diagram illustrating a method for switching of an active DL BWP based on a mismatch occurrence, according to an embodiment of the disclosure.

FIG. 3 is a diagram illustrating a method for switching of an active DL BWP based on a mismatch occurrence, according to an embodiment of the disclosure.

Referring to FIG. 3, UE's active UL BWP is UL BWP X and active DL BWP is DL BWP Y. Scheduling request is triggered. Contention based random access is initiated on SpCell as SR resource is not available. PRACH occasions are configured on active UL BWP, so active UL BWP is not switched. Active DL BWP is switched as DL BWP Id of active DL BWP is not same as BWP Id of active UL BWP. While the random access procedure is ongoing, UL grant (other than UL grant in RAR) becomes available and pending BSR is transmitted in UL grant or UL grant(s) includes all data available for transmission. The ongoing random access procedure triggered for pending SR transmission is terminated. In this example, upon cancellation of random access procedure, active DL BWP of SpCell is switched from DL BWP X to DL BWP Y.

Figure 4:
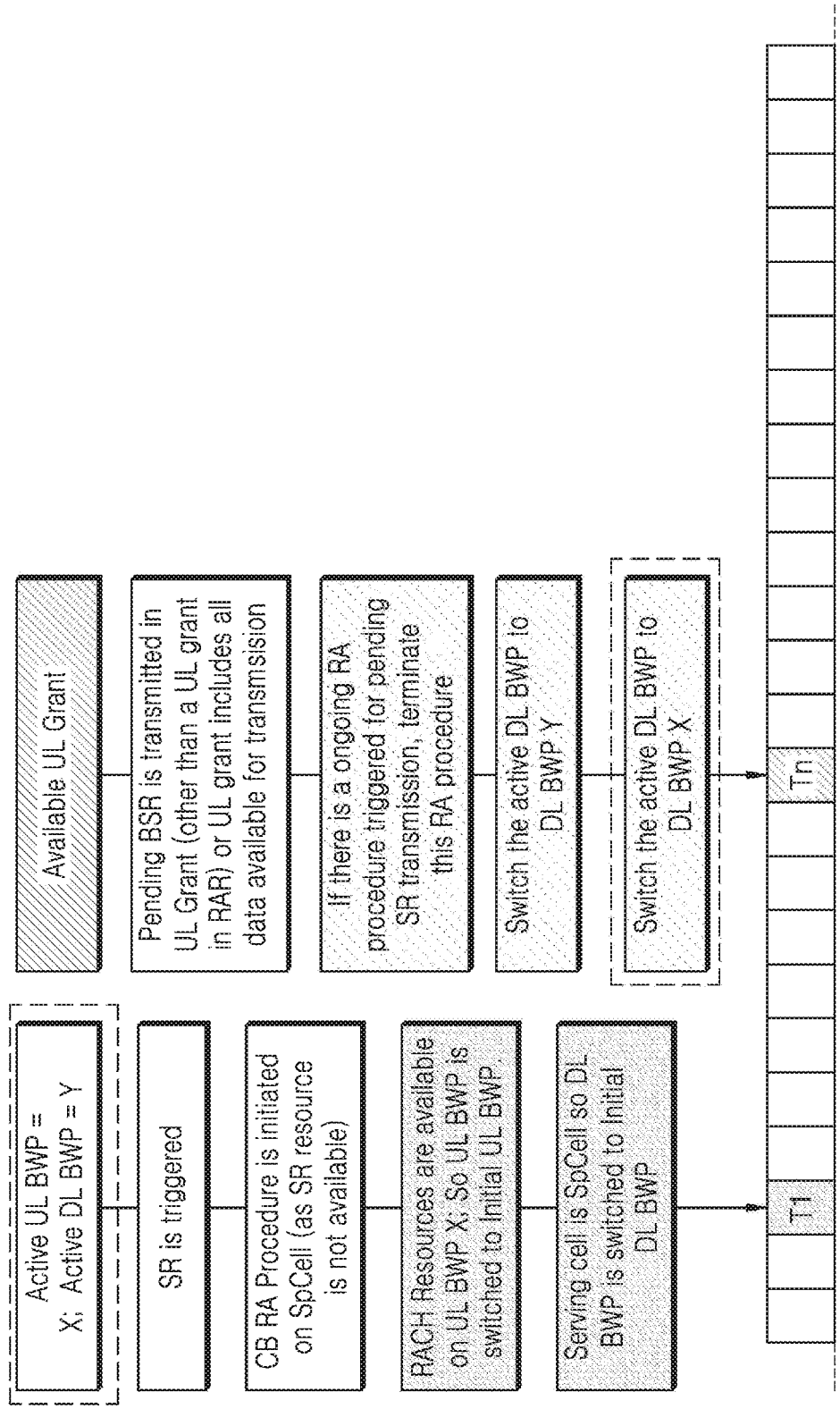
FIG. 4 is a diagram illustrating a method for switching of an active UL BWP based on a mismatch occurrence, according to an embodiment of the disclosure.

FIG. 4 is a diagram illustrating a method for switching of an active UL BWP based on a mismatch occurrence, according to an embodiment of the disclosure.

Referring to FIG. 4, UE's active UL BWP is UL BWP X and active DL BWP is DL BWP Y. Scheduling request is triggered. Contention based random access is initiated on SpCell as SR resource is not available. PRACH occasions are not configured on active UL BWP, so active UL BWP is switched to initial DL BWP. DL BWP is also switched to initial DL BWP. While the random access procedure is ongoing, UL grant becomes available and pending BSR is transmitted in UL grant (other than UL grant in RAR) or UL grant(s) includes all data available for transmission. The ongoing random access procedure triggered for pending SR transmission is terminated. In this example, upon cancellation of random access procedure, active DL BWP of SpCell is switched from DL BWP X to DL BWP Y. Active UL BWP of SpCell is switched from initial UL BWP to UL BWP X.

In an embodiment, the above described method can be used for any scenario in which ongoing random access procedure is cancelled.

Figure 5:
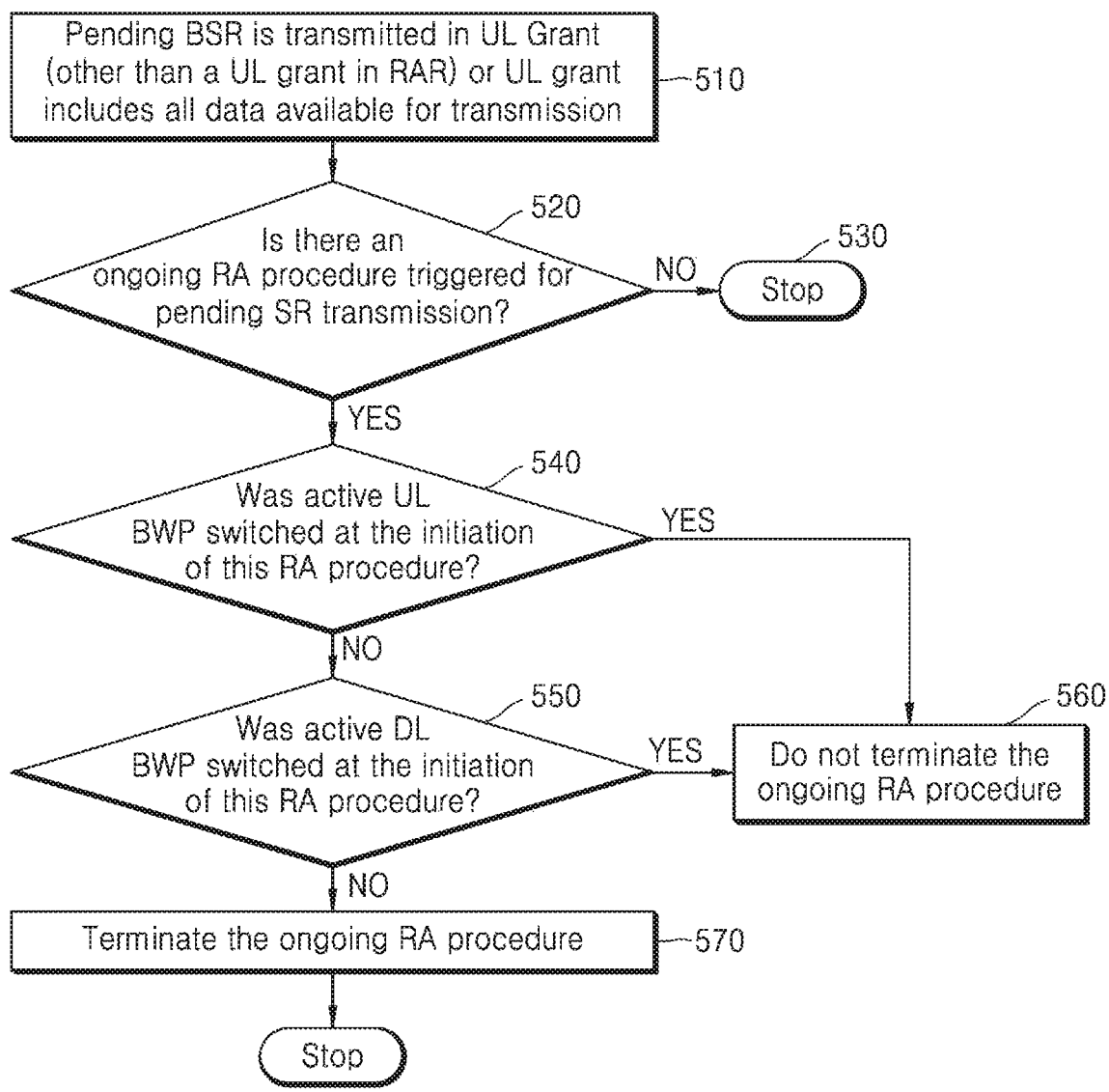
FIG. 5 is a flowchart illustrating terminating an ongoing RA procedure based on a mismatch occurrence, according to an embodiments of the disclosure.

Method 2:

FIG. 5 is a flowchart illustrating terminating the ongoing RA procedure based on a mismatch occurrence, according to an embodiment of the disclosure.

Referring to FIG. 5, a scheduling request is triggered. Contention based random access is initiated on SpCell as SR resource is not available. While the random access procedure is ongoing, UL grant (other than UL grant in RAR) becomes available and pending BSR is transmitted in UL grant or UL grant (s) includes all data available for transmission. In this method of disclosure UE operation when pending BSR is transmitted in UL grant (other than UL grant in RAR) or UL grant includes all data available for transmission is illustrated in FIG. 5.

In the disclosure we propose that, when pending BSR is transmitted in UL grant (other than UL grant in RAR) or UL grant(s) includes all data available for transmission:

In operation 510, a pending scheduling request is cancelled. In an embodiment, a pending scheduling request which is triggered for buffer status report (BSR) is cancelled when a MAC PDU is transmitted using a UL grant other than a UL grant provided by Random Access Response, and this PDU includes a BSR MAC CE which contains buffer status up to (and including) the last event that triggered a BSR prior to the MAC PDU assembly or UL grant(s) includes all data available for transmission. In another embodiment, a pending scheduling request which is triggered for sidelink buffer status report (SL BSR) is cancelled when a MAC PDU is transmitted using a UL grant other than a UL grant provided by Random Access Response, and this PDU includes a SL BSR MAC CE which contains buffer status up to (and including) the last event that triggered a SL BSR prior to the MAC PDU assembly or when SL grant(s) includes all SL data available for transmission. In another embodiment, a pending scheduling request which is triggered for transmitting a CQI report over SL is cancelled when a SL MAC PDU is transmitted using a SL grant, and this PDU includes a CQI report MAC CE which contains CQI report triggered prior to the MAC PDU assembly.

In operation 520, the UE identifies whether there is an ongoing random access procedure triggered for pending scheduling request transmission.

In operation 530, if there is no ongoing random access procedure, the UE stops operation relating the active BWP switching according to an embodiment of the disclosure.

In operation 540 and operation 550, the UE identifies whether the active UL BWP or the active DL BWP was switched at the time of initiation of this RA procedure.

In operation 570, if there is an ongoing random access procedure triggered for pending SR transmission and if neither active DL BWP nor active UL BWP was switched at the initiation of this random access procedure than the MAC entity terminates this ongoing random access procedure.

In operation 560, if there is an ongoing random access procedure triggered for pending SR transmission and if either active DL BWP or active UL BWP or both were switched at the initiation of this random access procedure than the MAC entity does not terminate this ongoing random access procedure. It is to be noted that SR triggered random access procedure is performed on SpCell. So UL BWP and DL BWP in the above description refers to UL BWP and DL BWP of SpCell. In case multiple active DL BWP(s) and multiple active UL BWP(s) are supported in a serving cell, active UL BWP and active DL BWP in the above description refers to UL BWP and DL BWP on which random access procedure is performed.

BWP Operation for BFR/RAR on SCell

As per the current design of random access procedure, a random access response or a response of beam failure recovery request is received on SpCell irrespective of whether random access preamble is transmitted on SpCell or SCell. However, this procedure is being enhanced in 3GPP wherein random access response or response of beam failure recovery request is received on serving cell on which random access preamble is transmitted. As per current procedure for random access procedure initiated on SCell wherein RAR is received on SCell, UE will unnecessarily switch the active DL BWP of SpCell. Additionally UE may not be on appropriate DL BWP for RAR reception resulting in RAR reception failure. Various methods proposed in this disclosure to overcome this issue are explained below.

Figure 6:
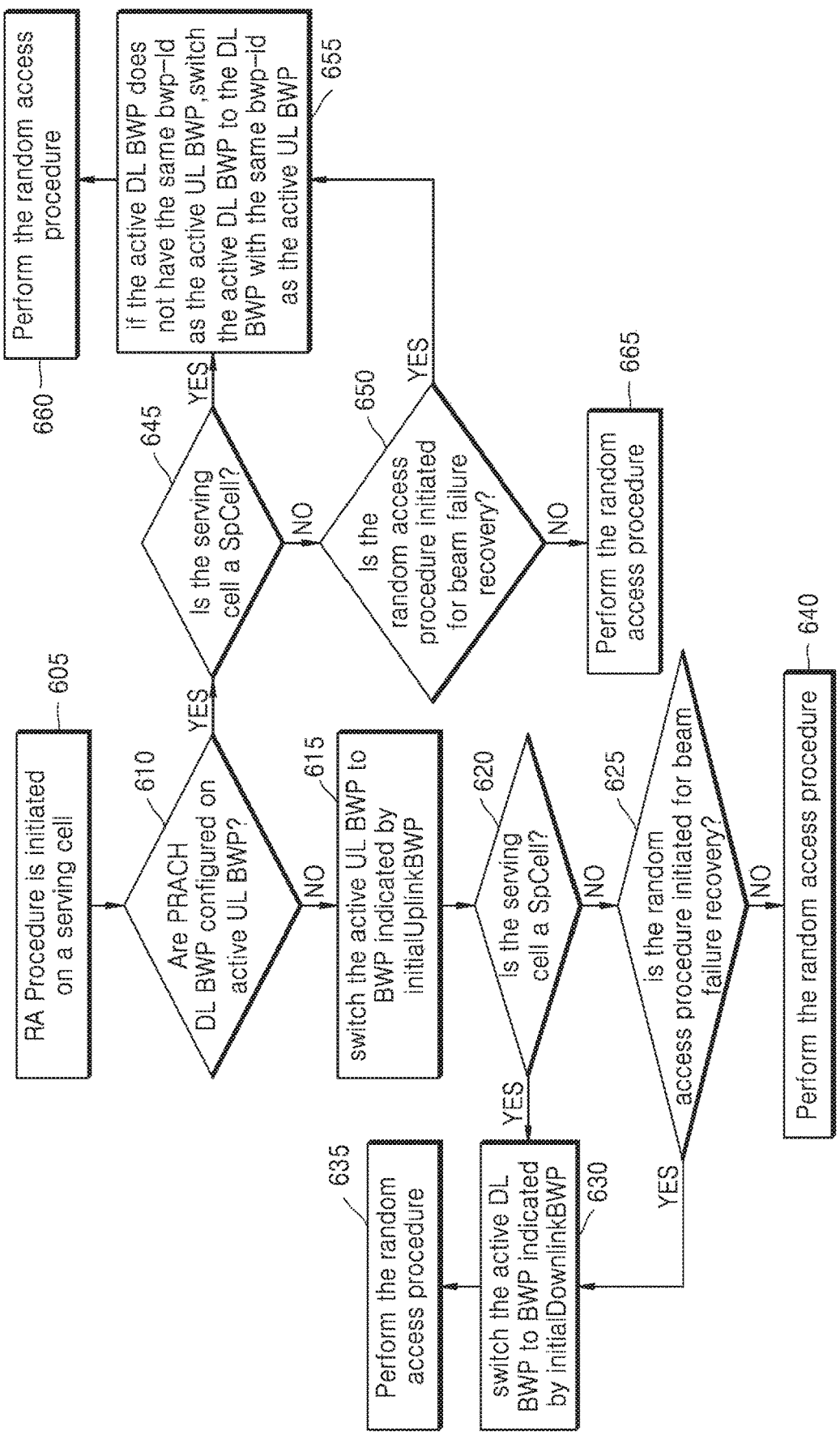
FIG. 6 is a flowchart illustrating BWP operation for BFR/BAR on SCell, according to an embodiment of the disclosure.

Method 1:

This method is illustrated in FIG. 6. FIG. 6 is a flowchart illustrating BWP operation for BFR/BAR on SCell, according to an embodiment of the disclosure.

Referring to FIG. 6, in operation 605, upon initiation of the Random Access procedure on a Serving Cell, the MAC entity shall for this Serving Cell perform the following:

In operation 610, the UE identifies whether PRACH occasions are configured on an active UL BWP.

if PRACH occasions are not configured for the active UL BWP:

switch the active UL BWP to BWP indicated by initialUplinkBWP; (operation 615)

based on an identification of whether the serving cell is a SpCell (operation 620), if the Serving Cell is a SpCell; or if the Serving Cell is a SCell and based on an identification of whether the random access procedure is initiated for beam failure recovery (operation 625), if the random access procedure is initiated for beam failure recovery:

switch the active DL BWP to BWP indicated by initialDownlinkBWP (operation 630) and perform the random access procedure (operation 635). It is to be noted that if active DL BWP is already initialDownlinkBWP then switching is not required.
if the Serving Cell is a SCell and if the random access procedure is not initiated for beam failure recovery:
perform the random access procedure (operation 640):
Else (if PRACH occasions are configured for the active UL BWP):
based on an identification of whether the serving cell is a SpCell (operation 645), if the Serving Cell is a SpCell; or
if the Serving Cell is a SCell and based on an identification of whether the random access procedure is initiated for beam failure recovery (operation 650), if the random access procedure is initiated for beam failure recovery:
if the active DL BWP does not have the same bwp-Id as the active UL BWP:
switch the active DL BWP to the DL BWP with the same bwp-Id as the active UL BWP (operation 655) and perform the random access procedure (operation 660).
if the Serving Cell is a SCell and if the random access procedure is not initiated for beam failure recovery:
perform the random access procedure (operation 665)

Alternate 1:

Upon initiation of the Random Access procedure on a Serving Cell, the MAC entity shall for this Serving Cell perform the following:
if PRACH occasions are not configured for the active UL BWP:
switch the active UL BWP to BWP indicated by initialUplinkBWP;
if the Serving Cell is a SpCell:
switch the active DL BWP to BWP indicated by initialDownlinkBWP. It is to be noted that if active DL BWP is already initialDownlinkBWP then switching is not required.
Else if random access procedure is initiated for beam failure recovery:
switch the active DL BWP to BWP indicated by initialDownlinkBWP. It is to be noted that if active DL BWP is already initialDownlinkBWP then switching is not required.
Else (if PRACH occasions are configured for the active UL BWP):
if the Serving Cell is a SpCell:
if the active DL BWP does not have the same bwp-Id as the active UL BWP:
switch the active DL BWP to the DL BWP with the same bwp-Id as the active UL BWP.
Else if random access procedure is initiated for beam failure recovery:
if the active DL BWP does not have the same bwp-Id as the active UL BWP:
switch the active DL BWP to the DL BWP with the same bwp-Id as the active UL BWP.

Alternate 2:

Upon initiation of the Random Access procedure on a Serving Cell, the MAC entity shall for this Serving Cell perform the following:
if PRACH occasions are not configured for the active UL BWP:
switch the active UL BWP to BWP indicated by initialUplinkBWP;
if the Serving Cell is a SpCell:
switch the active DL BWP to BWP indicated by initialDownlinkBWP. It is to be noted that if active DL BWP is already initialDownlinkBWP then switching is not required.
Else if random access procedure is initiated for beam failure recovery and search space for RAR is configured on this Serving Cell:
switch the active DL BWP to BWP indicated by initialDownlinkBWP. It is to be noted that if active DL BWP is already initialDownlinkBWP then switching is not required.
Else (if PRACH occasions are configured for the active UL BWP):
if the Serving Cell is a SpCell:
if the active DL BWP does not have the same bwp-Id as the active UL BWP:
switch the active DL BWP to the DL BWP with the same bwp-Id as the active UL BWP.
Else if random access procedure is initiated for beam failure recovery and search space for RAR is configured on this Serving Cell:
if the active DL BWP does not have the same bwp-Id as the active UL BWP:
switch the active DL BWP to the DL BWP with the same bwp-Id as the active UL BWP.

Figure 7:
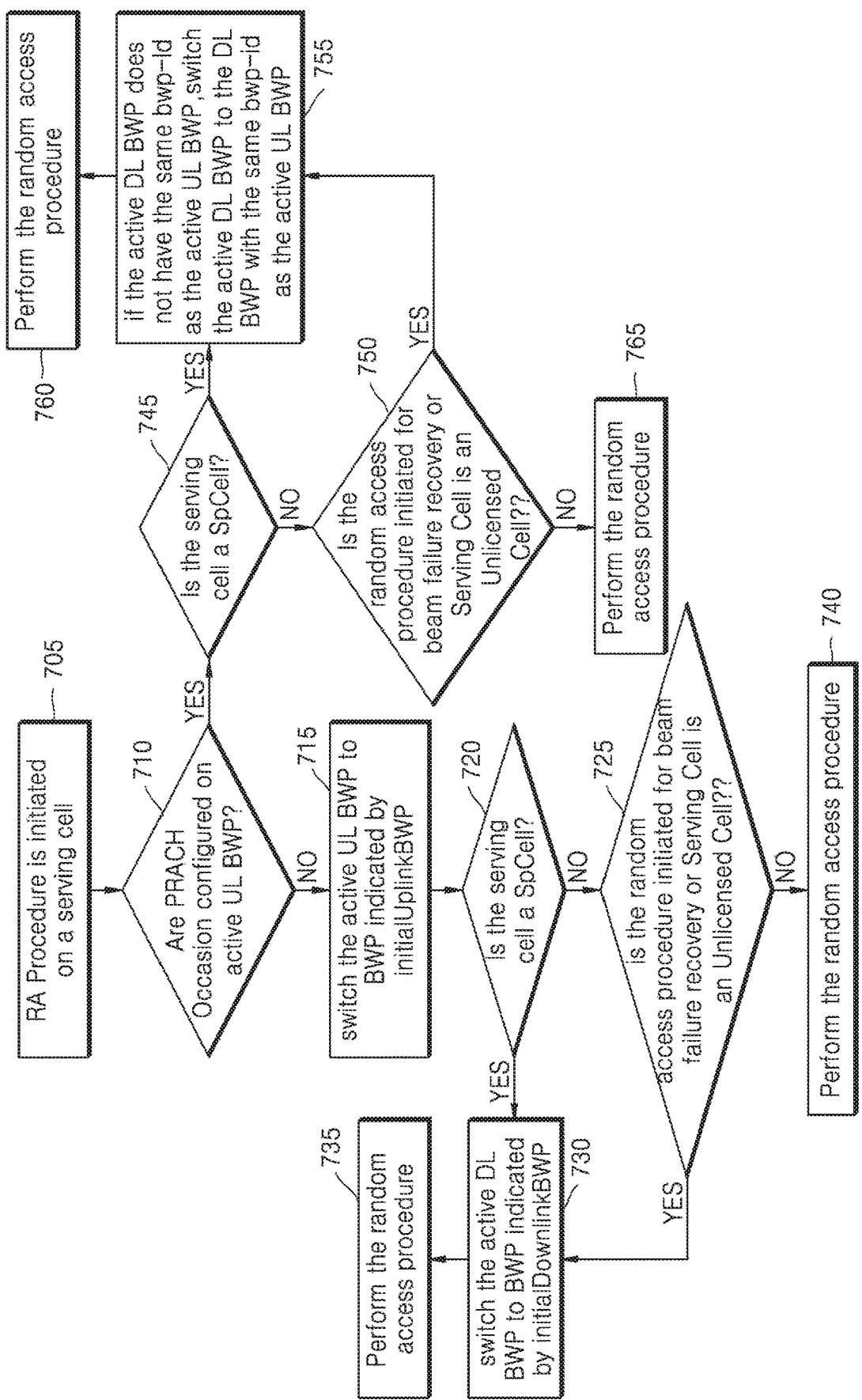
FIG. 7 is a flowchart illustrating BWP operation for BFR/BAR on SCell, according to an embodiment of the disclosure.

Method 2:

This method is illustrated in FIG. 7. FIG. 7 is a flowchart illustrating BWP operation for BFR/BAR on SCell, according to an embodiment of the disclosure.

Referring to FIG. 7, in operation 705, upon initiation of the Random Access procedure on a Serving Cell, the MAC entity shall for this Serving Cell perform the following:

In operation 710, the UE identifies whether PRACH occasions are configured on an active UL BWP.
if PRACH occasions are not configured for the active UL BWP:
switch the active UL BWP to BWP indicated by initialUplinkBWP (operation 715);
based on an identification of whether the serving cell is a Spcell (operation 720), if the Serving Cell is a SpCell; or
if the Serving Cell is a SCell and based on an identification of whether the random access procedure is initiated for beam failure recovery or serving cell in a unlicensed Scell (operation 725), if the random access procedure is initiated for beam failure recovery; or if the Serving Cell is a Unlicensed Scell:
switch the active DL BWP to BWP indicated by initialDownlinkBWP (operation 730) and perform the random access procedure (operation 735). It is to be noted that if active DL BWP is already initialDownlinkBWP then switching is not required.
if the Serving Cell is a Scell and if the random access procedure is not initiated for beam failure recovery or if the Scell is an unlicensed cell (i.e. operating on unlicensed spectrum):
perform the random access procedure (operation 740):
Else (if PRACH occasions are configured for the active UL BWP):
based on an identification of whether the serving cell is a SpCell (operation 745), if the Serving Cell is a SpCell; or
if the Serving Cell is a Scell and based on an identification of whether the random access procedure is initiated for beam failure recovery (operation 750), if the random access procedure is initiated for beam failure recovery; or if the Serving Cell is a Unlicensed Scell:

if the active DL BWP does not have the same bwp-Id as the active UL BWP:

switch the active DL BWP to the DL BWP with the same bwp-Id as the active UL BWP (operation 755) and perform the random access procedure (operation 760).

if the Serving Cell is a Scell and if the random access procedure is not initiated for beam failure recovery or if the Scell is an unlicensed cell (i.e. operating on unlicensed spectrum):

perform the random access procedure (operation 765)

Alternate 1:

Upon initiation of the Random Access procedure on a Serving Cell, the MAC entity shall for this Serving Cell perform the following:

if PRACH occasions are not configured for the active UL BWP:

switch the active UL BWP to BWP indicated by initialUplinkBWP;

if the Serving Cell is a SpCell; or if the Serving Cell is a Scell and random access procedure is initiated for beam failure recovery and search space for RAR is configured on this Serving Cell; or if the Serving Cell is a Unlicensed Scell and search space for RAR is configured on this Serving Cell:

switch the active DL BWP to BWP indicated by initial-DownlinkBWP. It is to be noted that if active DL BWP is already initialDownlinkBWP then switching is not required.

Else (if PRACH occasions are configured for the active UL BWP):

if the Serving Cell is a SpCell; or if the Serving Cell is a Scell and random access procedure is initiated for beam failure recovery and search space for RAR is configured on this Serving Cell; or if the Serving Cell is a Unlicensed Scell and search space for RAR is configured on this Serving Cell:

if the active DL BWP does not have the same bwp-Id as the active UL BWP:

switch the active DL BWP to the DL BWP with the same bwp-Id as the active UL BWP.

In the above operation, unlicensed cell is cell operating on unlicensed carrier frequency.

Figure 8:
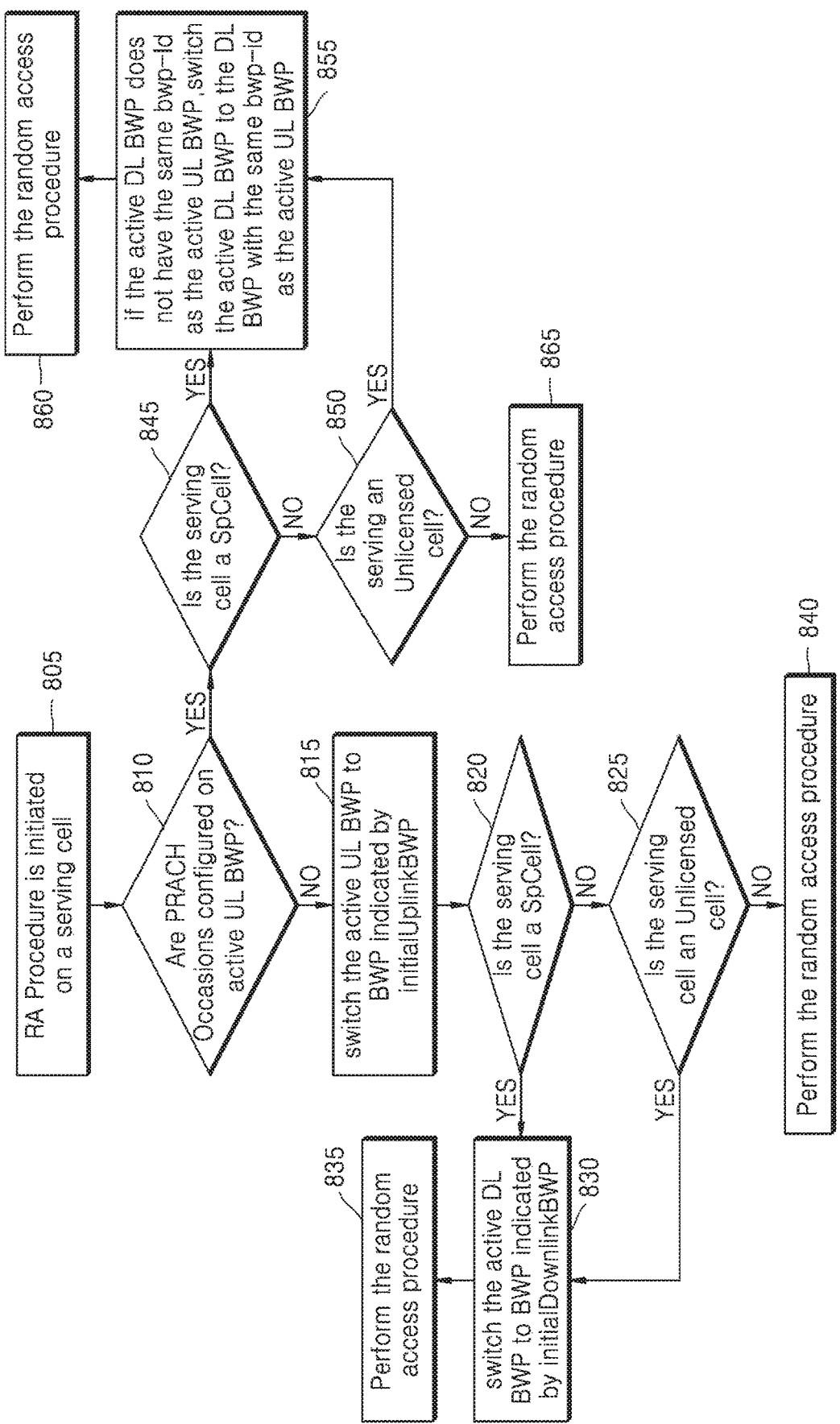
FIG. 8 is a flowchart illustrating BWP operation for BFR/BAR on SCell, according to an embodiment of the disclosure.

Method 3:

This method is illustrated in FIG. 8. FIG. 8 is a flowchart illustrating BWP operation for BFR/BAR on Scell, according to an embodiment of the disclosure. Referring to FIG. 8, in operation 805, upon initiation of the Random Access procedure on a Serving Cell, the MAC entity shall for this Serving Cell perform the following:

In operation 810, the UE identifies whether PRACH occasions are configured on an active UL BWP.

if PRACH occasions are not configured for the active UL BWP:

switch the active UL BWP to BWP indicated by initialUplinkBWP (operation 815);

based on an identification of whether the serving cell is a SpCell (operation 820), if the Serving Cell is a SpCell; or based on an identification of whether the serving cell is an unlicensed cell (operation 825), if the if the Serving Cell is a Unlicensed SCell:

switch the active DL BWP to BWP indicated by initial-DownlinkBWP (operation 830) and perform the random access procedure (operation 835). It is to be noted that if active DL BWP is already initialDownlinkBWP then switching is not required.

if the Serving Cell is a SCell and if this SCell is not an unlicensed cell:

perform the random access procedure (operation 840):

Else (if PRACH occasions are configured for the active UL BWP):

based on an identification of whether the serving cell is a Spcell (operation 845), if the Serving Cell is a SpCell; or based on an identification of whether the serving cell is an unlicensed cell (operation 850), if the Serving Cell is a Unlicensed SCell:

if the active DL BWP does not have the same bwp-Id as the active UL BWP:

switch the active DL BWP to the DL BWP with the same bwp-Id as the active UL BWP (operation 855) and perform the random access procedure (operation 860).

if the Serving Cell is a SCell and if this SCell is not an unlicensed cell:

perform the random access procedure (operation 865)

Alternate 1:

Upon initiation of the Random Access procedure on a Serving Cell, the MAC entity shall for this Serving Cell perform the following:

if PRACH occasions are not configured for the active UL BWP:

switch the active UL BWP to BWP indicated by initialUplinkBWP;

if the Serving Cell is a SpCell; or if the Serving Cell is a Unlicensed SCell and search space for RAR is configured on this Serving Cell:

switch the active DL BWP to BWP indicated by initial-DownlinkBWP. It is to be noted that if active DL BWP is already initialDownlinkBWP then switching is not required.

Else (if PRACH occasions are configured for the active UL BWP):

if the Serving Cell is a SpCell; or if the Serving Cell is a Unlicensed SCell and search space for RAR is configured on this Serving Cell:

if the active DL BWP does not have the same bwp-Id as the active UL BWP:

switch the active DL BWP to the DL BWP with the same bwp-Id as the active UL BWP.

In the above operation, unlicensed cell is cell operating on unlicensed carrier frequency.

Figure 9:
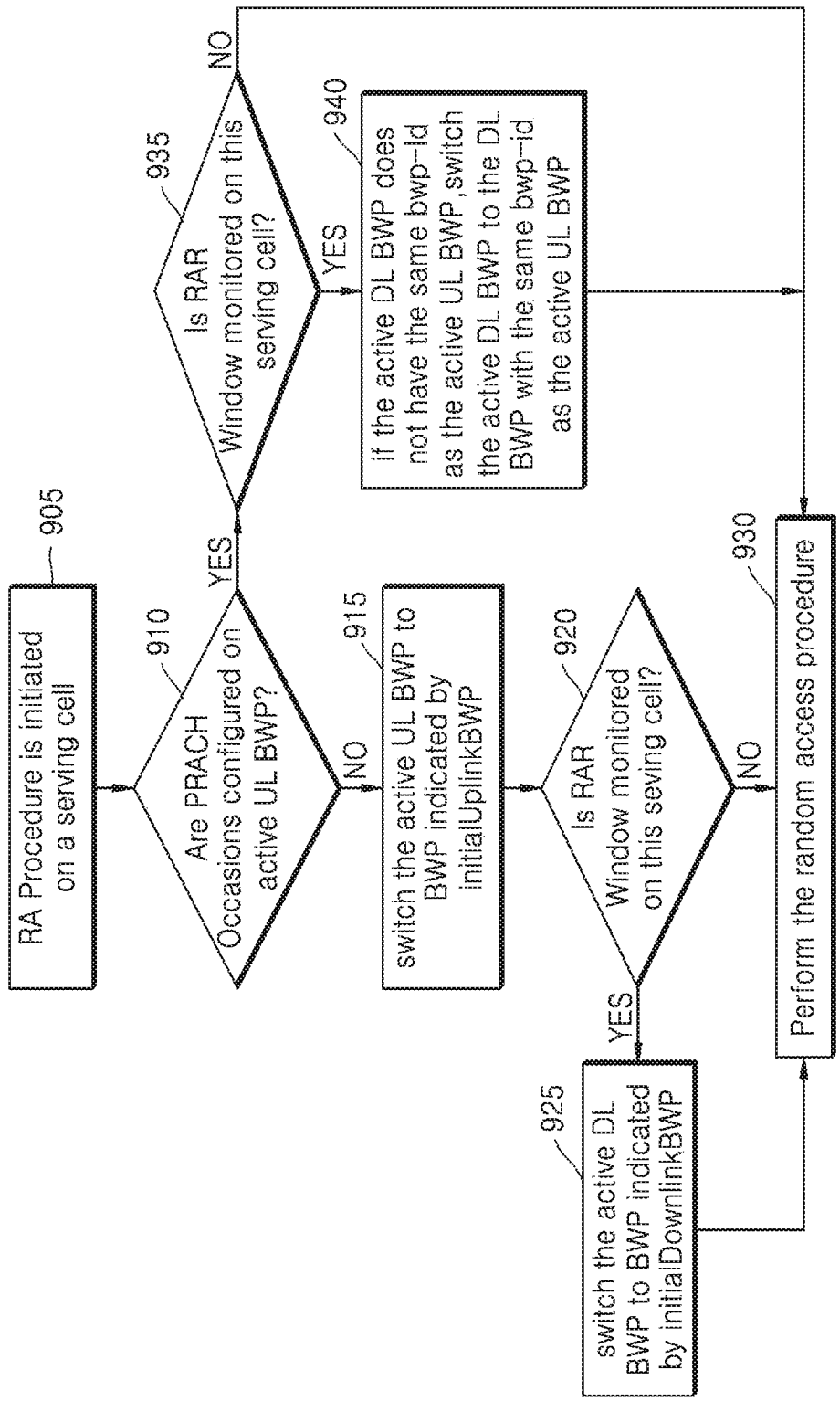
FIG. 9 is a flowchart illustrating BWP operation for BFR/BAR on SCell, according to an embodiment of the disclosure.

Method 4:

This method is illustrated in FIG. 9. FIG. 9 is a flowchart illustrating BWP operation for BFR/BAR on SCell, according to an embodiment of the disclosure. Referring to FIG. 9, in operation 905, upon initiation of the Random Access procedure on a Serving Cell, the MAC entity shall for this Serving Cell perform the following:

based on an identification of whether PRACH occasions are configured on the active UL BWP (operation 910), if PRACH occasions are not configured for the active UL BWP:

switch the active UL BWP to BWP indicated by initialUplinkBWP (operation 915);

based on an identification of whether RAR Window is monitored on this serving cell (operation 920), if the RAR window for this random access procedure is monitored on this Serving Cell:

switch the active DL BWP to BWP indicated by initial-DownlinkBWP (operation 925) and perform the random access procedure (operation 930).

Else (if PRACH occasions are configured for the active UL BWP):

based on an identification of whether RAR window is monitored on the serving cell (operation 935), if the RAR window for this random access procedure is monitored on this Serving Cell:

if the active DL BWP does not have the same bwp-Id as the active UL BWP:

switch the active DL BWP to the DL BWP with the same bwp-Id as the active UL BWP (operation 940).

Figure 10:
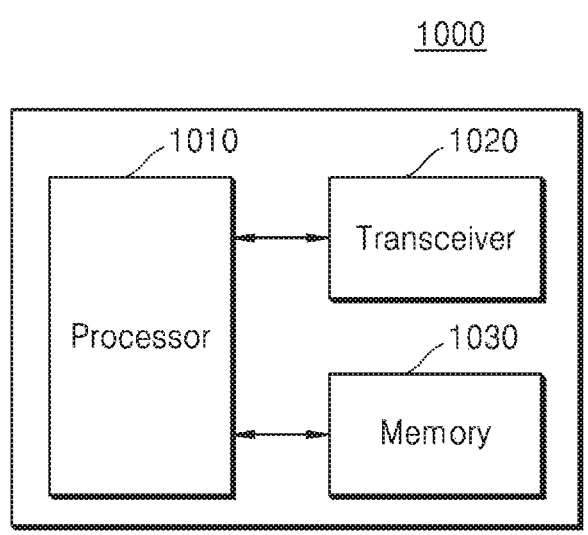
FIG. 10 is a diagram illustrating a UE 1000 according to an embodiment of the disclosure.

FIG. 10 is a diagram illustrating a UE 1000 according to an embodiment of the disclosure.

Referring to FIG. 10, the UE 1000 may include a processor 1010, a transceiver 1020 and a memory 1030. However, all of the illustrated components are not essential. The UE 1000 may be implemented by more or less components than those illustrated in the FIG. 10. In addition, the processor 1010 and the transceiver 1020 and the memory 1030 may be implemented as a single chip according to another embodiment.

The aforementioned components will now be described in detail.

The processor 1010 may include one or more processors or other processing devices that control the proposed function, process, and/or method. Operation of the UE 1000 may be implemented by the processor 1010.

The processor 1010 may identify an ongoing random access (RA) procedure triggered for a pending scheduling request (SR) transmission. The processor 1010 may identify whether an active uplink bandwidth part (UL BWP) or an active downlink bandwidth part (DL BWP) is switched at an initiation of the ongoing RA procedure. The processor 1010 may perform an operation of switching the active UL BWP or the active DL BWP to an initiation BWP or an operation of terminating the ongoing RA procedure based on a result of the identification.

The transceiver 1020 may include a RF transmitter for up-converting and amplifying a transmitted signal, and a RF receiver for down-converting a frequency of a received signal. However, according to another embodiment, the transceiver 1020 may be implemented by more or less components than those illustrated in components.

The transceiver 1020 may be connected to the processor 1010 and transmit and/or receive a signal. The signal may include control information (e.g. UL grants) and data. In addition, the transceiver 1020 may receive the signal through a wireless channel and output the signal to the processor 1010. The transceiver 1020 may transmit a signal output from the processor 1010 through the wireless channel.

The memory 1030 may store the control information or the data included in a signal obtained by the UE 1000. The memory 1030 may be connected to the processor 1010 and store at least one instruction or a protocol or a parameter for the proposed function, process, and/or method. The memory 1030 may include read-only memory (ROM) and/or random access memory (RAM) and/or hard disk and/or CD-ROM and/or DVD and/or other storage devices.

Figure 11:
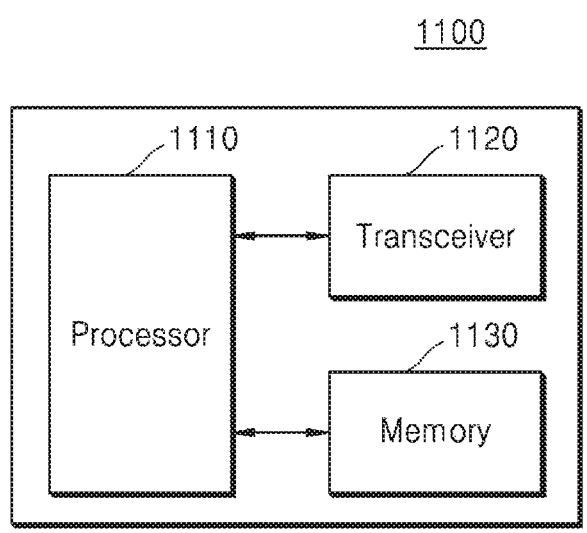
FIG. 11 is a diagram illustrating a base station 1100 according to an embodiment of the disclosure.

FIG. 11 is a diagram illustrating a base station 1100 according to an embodiment of the disclosure.

Referring to FIG. 11, the base station 1100 may include a processor 1110, a transceiver 1120 and a memory 1130. However, all of the illustrated components are not essential. The base station 1100 may be implemented by more or less components than those illustrated in FIG. 11. In addition, the processor 1110 and the transceiver 1120 and the memory 1130 may be implemented as a single chip according to another embodiment.

The aforementioned components will now be described in detail.

The processor 1110 may include one or more processors or other processing devices that control the proposed function, process, and/or method. Operation of the base station 1100 may be implemented by the processor 1110.

The processor 1110 may control the transceiver 1120 to receive a scheduling request (SR) from a user equipment (UE). The processor 1110 may initiate a random access (RA) procedure in case of the SR being unavailable.

The transceiver 1120 may include a RF transmitter for up-converting and amplifying a transmitted signal, and a RF receiver for down-converting a frequency of a received signal. However, according to another embodiment, the transceiver 1120 may be implemented by more or less components than those illustrated in components.

The transceiver 1120 may be connected to the processor 1110 and transmit and/or receive a signal. The signal may include control information and data. In addition, the transceiver 1120 may receive the signal through a wireless channel and output the signal to the processor 1110. The transceiver 1120 may transmit a signal output from the processor 1110 through the wireless channel.

The memory 1130 may store the control information or the data included in a signal obtained by the base station 1100. The memory 1130 may be connected to the processor 1110 and store at least one instruction or a protocol or a parameter for the proposed function, process, and/or method. The memory 1130 may include read-only memory (ROM) and/or random access memory (RAM) and/or hard disk and/or CD-ROM and/or DVD and/or other storage devices. At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

While the disclosure has been shown and described with reference to various embodiments, it will be understood by those skilled in the art that various changes in form and details may be made therein without departing from the spirit and scope of the disclosure as defined by the appended claims and their equivalents.

What is claimed is:

1. A method of performing communication in a wireless communication system, by a user equipment (UE), comprising:
   initiating a random access (RA) procedure based on no valid physical uplink control channel (PUCCH) resources configured for a pending scheduling request (SR);
   in case that a medium access control protocol data unit (MAC PDU) associated with the SR is transmitted using an uplink (UL) grant other than a UL grant provided by a random access response or at least one UL grant is able to accommodate all pending data available for transmission, terminating the initiated RA procedure;
   identifying whether an active UL bandwidth part (BWP) is switched to an initial UL BWP at the initiation of the RA procedure; and
   in case that the active UL BWP is switched at the initiation of the RA procedure, switching the active UL BWP from the initial UL BWP to a UL BWP activated before the initiation of the RA procedure based on the termination of the initiated RA procedure.

2. The method of claim 1, further comprising:
   identifying whether an active downlink bandwidth part (DL BWP) is switched to an initial DL BWP at the initiation of the RA procedure; and
   in case that the active DL BWP is switched at the initiation of the RA procedure, switching the active DL BWP from the initial DL BWP to a DL BWP activated before the initiation of the RA procedure.

3. The method of claim 1, wherein the RA procedure is performed on a special cell (SpCell).

4. A user equipment (UE) of performing communication in a wireless communication system, the UE comprising:
   a transceiver; and
   a processor configured to:
      initiate a random access (RA) procedure based on no valid physical uplink control channel (PUCCH) resources configured for a pending scheduling request (SR),
      in case that a medium access control protocol data unit (MAC PDU) associated with the SR is transmitted using an uplink (UL) grant other than a UL grant provided by a random access response or at least one UL grant is able to accommodate all pending data available for transmission, terminate the initiated RA procedure,
      identify whether an active UL bandwidth part (BWP) is switched to an initial UL BWP at the initiation of the RA procedure, and
      in case that the active UL BWP is switched at the initiation of the RA procedure, switch the active UL BWP from the initial UL BWP to a UL BWP activated before the initiation of the RA procedure, based on the termination of the initiated RA procedure.

5. The UE of claim 4, wherein the processor is further configured to:
   identify whether an active downlink bandwidth part (DL BWP) is switched to an initial DL BWP at the initiation of the RA procedure, and
   in case that the active DL BWP is switched at the initiation of the RA procedure, switch the active DL BWP from the initial DL BWP to a DL BWP activated before the initiation of the RA procedure.

6. The UE of claim 4, wherein the RA procedure is performed on a special cell (SpCell).

* * * * *